June 6, 1950 R. B. DOME 2,510,623
DEFLECTION LIMITER
Filed Jan. 28, 1948
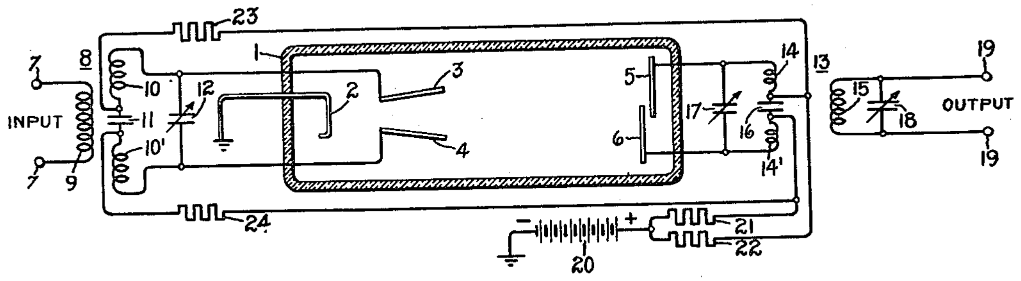
Inventor:
Robert B. Dome,
by Merton D. Morse
His Attorney.

UNITED STATES PATENT OFFICE 2,510,623

DEFLECTION LIMITER

Robert B. Dome, Geddes Township, Onondaga County, N. Y., assignor to General Electric Company, a corporation of New York Application January 28, 1948, Serial No. 4,810

6 Claims. (Cl. 178—44)

This invention relates to amplitude limiters for use in frequency modulation receiving systems and the like and more particularly to such limiters utilizing electron beam tubes to effect the limiting action.

It is well-known in frequency modulation receiving systems to provide a stage in such systems to remove any incidental amplitude modulations that might appear on an intercepted frequency modulated signal. These stages, known as limiter stages, usually comprise a readily saturable electron discharge device operating between cut-off and a saturated condition. Limiter stages utilizing electron beam tubes have also been proposed in the teachings of the prior art.

It is an object of this invention to provide an improved limiter stage using an electron beam tube circuit whereby any amplitude modulation that might appear upon an impressed frequency modulation signal is effectively removed.

It is a further object of this invention to provide an electron beam tube circuit for use in such systems in which the potential level at which the limiting action is initiated is relatively low and wherein any amplitude variations in an applied signal, beyond this potential level, are to all practical purposes completely removed.

Yet another object of this invention is to provide an improved electron discharge device stage wherein the deleterious effects of stray magnetic or electric fields are substantially reduced.

The features of this invention which are believed to be new are set forth with particularity in the appended claims. The invention itself, however, together with further objects and advantages thereof may best be understood by reference to the accompanying drawing wherein the single figure shows one embodiment of the present invention.

Referring now to the drawing, an electron beam tube is designated generally as 1. The beam tube 1 contains a cathode 2, deflecting electrodes 3 and 4, and a pair of target electrodes 5 and 6. Frequency modulated signals may be applied to terminals 7, and deflecting electrodes 3 and 4 are excited thereby through transformer 8. Transformer 8 comprises a primary winding 9 and a split secondary winding 10 and 10', the adjacent ends of the secondary winding being coupled together by way of by-pass capacitor 11. When this circuit is inserted in a conventional superheterodyne receiving system following the intermediate frequency amplifier stages, capacitor 11 is given such a value that it by-passes the intermediate frequencies. However, the invention is not limited to such systems, and when, for example, the frequency modulated signals applied thereto have a frequency in the radio spectrum, capacitor 11 is given a value such that it by-passes radio frequencies. The secondary winding 10, 10' is tuned by variable capacitor 12 and the extremities of this winding are connected respectively to deflecting electrodes 3 and 4. The output circuit comprises a transformer 13, having a split primary winding 14, 14', tuned by variable capacitor 17, and a secondary winding 15, tuned by variable capacitor 18. The adjacent ends of primary winding 14, 14' are coupled together by capacitor 16 and the extremities of this winding are connected respectively to target electrodes 5 and 6. The limited frequency modulation output may be derived across secondary winding 15 by way of terminals 19.

The respective target electrodes 5 and 6 are connected to a source of unidirectional potential 20 through split primary winding 14, 14' and resistors 21 and 22. The unidirectional source 20 is illustrated as a battery having its negative terminal connected to ground. The deflecting electrodes 3 and 4 are also connected to source 20 through direct current connections including resistors 23, 22 and 24, 21 respectively, and respective sections 10, 10' of the secondary winding of transformer 8.

It is necessary that the average deflection of the electron beam be on the dividing line between the target electrodes in such types of limiter devices, for when this average deflection is such that the beam falls on one or the other of these electrodes, the potential level at which the limiting action is effective is extremely high, and in fact amplitude modulation can never be entirely eliminated at any input level. The present invention provides means for assuring that the average deflection of the electron beam is on the dividing line between target electrodes 5 and 6, this being accomplished by means of the direct current connections through resistors 23 and 24, connecting the target electrodes back to the deflecting electrodes 3 and 4. In the event that there is a tendency for the electron beam to rest on target 5 longer than on target 6, due to the mean deflection being to one side of exact center, electrode 5 draws a greater unidirectional current than electrode 6. Therefore, when resistors 21 and 22 are made equal in value, the potential drop across resistor 22 exceeds that across resistor 21, and hence the unidirectional potential of electrode 5 is less than that of electrode 6. Since deflecting electrode 3 is biased through resistor 23 at the average potential of target electrode 5, deflecting electrode 3 thus becomes negative with respect to deflecting electrode 4, and this condition causes the beam to shift towards target electrode 6, thereby tending to equalize the average currents drawn by the two target electrodes. A similar condition exists when the average deflection of the beam tends to fall on target electrode 6. It can therefore be seen that at all times the average deflection of the beam is such that the beam falls on the dividing line of target electrodes 5 and 6.

When frequency modulated signals are applied to terminals 7, the electron beam of device 1 is deflected from one target electrode to the other and constant amplitude signals may be derived at terminals 19, these signals having frequency characteristics similar to the input signals. Due to the fact that the average deflection of the beam is centered between the targets, any amplitude modulation carried by the input signals merely deflects the beam a greater distance over one or the other of the target electrodes 5 and 6 and has no effect on the output signals. The target electrodes 5 and 6 may be so arranged that they overlap, as shown in the accompanying figure, so that there is no gap between them, and a continuous transition from one target to the other is realized.

In addition to providing an improved amplitude limiting action, the present invention also provides a means for reducing the undesired effects of stray magnetic and electric fields.

When, for example, the beam tube is in the magnetic field of a power transformer, the beam would be deflected by the magnetic field resulting therefrom and the result would be a serious modulation of the output signal. The self-correcting circuit which is shown herein aids substantially in reducing this effect since the potentials applied to electrodes 3 and 4 would tend to deflect the beam in the opposite direction. Since the by-pass capacitors 11 and 16 are effective for intermediate frequencies or radio frequencies only, audio frequency variations may take place as needed for correction.

This invention therefore provides an amplitude limiter stage suitable for use in frequency modulation receiving systems, utilizing an electron beam tube circuit wherein means are provided so that the average deflection of the electron beam always falls on the dividing line between the two target electrodes, thereby assuring that the limiting device operates efficiently. The input signal level at which the limiting action is initiated is relatively low, and any amplitude modulation contained in the input signals is effectively removed.

While a certain specific embodiment has been shown and described, it will, of course, be understood that various modifications may be made without departing from the invention. The appended claims are therefore intended to cover any such modifications coming within the true spirit and scope of the invention.

What I claim as new and desire to secure by Letters Patent of the United States is:

1. In combination an electron beam tube, an input circuit and an output circuit, said electron beam tube comprising a source of electrons, beam deflecting means, and target electrode means, means for coupling said input circuit to said deflecting means, means for coupling said output circuit to said target electrode means, and means comprising a direct current connection between said target electrode means and said beam deflecting means to maintain the average deflection of the electron beam in said beam tube centered on said target electrode means.

2. An amplitude limiting device for use in frequency modulation receiving systems and the like comprising, an input circuit, an electron beam tube, and an output circuit, said electron beam tube including a source of electrons, beam deflecting means, and target electrode means, said input circuit being coupled to said beam deflecting means, and said output circuit being coupled to said target electrode means, means for impressing frequency modulated signals on said input circuit, means for deriving limited frequency modulation signals from said output circuit, and means comprising a direct current connection between said target electrode means and said deflecting means to maintain the average deflection of the electron beam of said beam tube centered on said target electrode means.

3. An amplitude limiting device for use in frequency modulation receiving systems and the like comprising, an input circuit, an electron beam tube, and an output circuit, said electron beam tube including a source of electrons, a pair of beam deflecting electrodes, and a pair of target electrodes having a dividing line therebetween, said input circuit being coupled to said beam deflecting electrodes, and said output circuit being coupled to said target electrodes, means for impressing frequency modulated signals on said input circuit, means for deriving limited frequency modulated signals from said output circuit, and means comprising direct current connections between said target electrodes respectively and said beam deflecting electrodes to maintain the average deflection of the electron beam in said beam tube on the dividing line between said target electrodes.

4. An amplitude limiting device comprising a source of frequency modulation signals, an input transformer having a primary winding and a secondary winding, an electron beam tube, and an output transformer having a primary winding and a secondary winding, said electron beam tube including a source of electrons, beam deflecting means, and target electrode means, means for coupling the primary winding of said input transformer to said source, means for coupling the secondary winding of said input transformer to said beam deflecting means, means for coupling the primary winding of said output transformer to said target electrode means, means for deriving limited frequency modulated signals across the secondary winding of said output transformer, and means comprising a direct current connection between said target electrode means and said deflecting means to maintain the average deflection of the electron beam of said beam tube centered on said target electrode means.

5. An amplitude limiting device comprising, a source of frequency modulated signals, an input transformer having a primary winding and secondary winding, an electron beam tube, and an output transformer having a primary winding and a secondary winding, said electron beam tube including a source of electrons, a pair of beam deflecting electrodes and a pair of target electrodes having a dividing line therebetween, means for coupling the primary winding of said input transformer to said source, means for coupling the secondary winding of said input transformer to said deflecting electrodes, means for coupling the primary winding of said output transformer to said target electrodes, means for deriving limiting frequency modulated signals across the secondary winding of said output transformer, and circuit means for maintaining respective of said target electrodes and corresponding of said deflecting electrodes at substantially the same unidirectional potential to maintain the average deflection of the beam of said beam tube on the dividing line between said target electrodes.

6. An amplitude limiting device comprising, a source of frequency modulated signals, an input transformer having a primary winding and a secondary winding, an electron beam tube, and an output transformer having a primary winding and a secondary winding, said electron beam tube including a source of electrons, a pair of beam deflecting electrodes, and a pair of target electrodes having a dividing line therebetween and so arranged that a portion of one of said electrodes overlaps a portion of the other of said electrodes, means for coupling the primary winding of said input transformer to said source, means for coupling the secondary winding of said input transformer to said beam deflecting electrodes, means for coupling the primary winding of said output transformer to said target electrodes, means for deriving limited frequency modulated signals across the secondary winding of said output transformer, and circuit means for maintaining respective of said target electrodes and corresponding of said beam deflecting electrodes at substantially the same unidirectional potential to maintain the average deflection of the electron beam of said beam tube on the dividing line between said target electrodes.

ROBERT B. DOME.

REFERENCES CITED

The following references are of record in the file of this patent:

UNITED STATES PATENTS

| Number | Name | Date |
|---|---|---|
| 1,969,573 | Montgomery | Aug. 7, 1934 |
| 2,024,979 | Metcalf | Dec. 17, 1935 |
| 2,262,406 | Rath | Nov. 11, 1941 |
| 2,431,396 | Hansell | Nov. 25, 1947 |